United States Patent [19]

Ochi

[11] Patent Number: 4,757,608
[45] Date of Patent: Jul. 19, 1988

[54] DOOR INSTALLING APPARATUS IN VEHICLE ASSEMBLING LINE

[75] Inventor: Tadashi Ochi, Hiroshima, Japan

[73] Assignee: Mazda Motor Corporation, Hiroshima, Japan

[21] Appl. No.: 26,752

[22] Filed: Mar. 17, 1987

[30] Foreign Application Priority Data

Mar. 18, 1986 [JP] Japan .................................. 61-59775
Mar. 18, 1986 [JP] Japan .................................. 61-59776

[51] Int. Cl.⁴ .......................................... B23P 21/00
[52] U.S. Cl. ...................................... 29/787; 29/33 K;
29/430; 29/703; 29/712; 29/824; 414/225;
414/684.3; 414/751; 901/8
[58] Field of Search ............... 29/33 K, 430, 703, 709,
29/711, 712, 783, 787, 793, 822, 823, 824, 771;
198/339.1, 341; 414/225; 901/7, 8, 40

[56] References Cited

U.S. PATENT DOCUMENTS

| 2,259,728 | 10/1941 | Bridges | 198/447 X |
|---|---|---|---|
| 4,589,184 | 5/1986 | Asano et al. | 29/430 |
| 4,589,199 | 5/1986 | Ohtaki et al. | 29/430 X |
| 4,627,158 | 12/1986 | Mitoh | 29/771 |
| 4,685,208 | 8/1987 | Sekiraku | 29/824 X |

FOREIGN PATENT DOCUMENTS

| 36627 | 10/1978 | Japan | 29/824 |
|---|---|---|---|
| 57-48334 | 10/1982 | Japan. | |
| 155326 | 8/1985 | Japan | 29/703 |

Primary Examiner—P. W. Echols
Assistant Examiner—Andrew E. Rawlins
Attorney, Agent, or Firm—Fleit, Jacobson, Cohn & Price

[57] ABSTRACT

A vehicle body assembling line includes a door installing station where vehicle side doors are installed on the body. In the installing station, there is an installing robot which is planned to operate in a predetermined sequence to install the doors on the vehicle body. For supplying appropriate doors to the installing robot from the door storing sections, a door pick up mechanism is provided to pick up an appropriate door from the storing section and a door transferring carriage is provided to receive the door from the pick up mechanism and transfer to the robot. The arrangement can afford an effective door installing operation.

17 Claims, 8 Drawing Sheets

DOOR INSTALLING APPARATUS IN VEHICLE ASSEMBLING LINE

BACKGROUND OF THE INVENTION

1. Field of the Invention

The present invention relates to an apparatus for assembling vehicle bodies and more particularly to an apparatus for installing vehicle doors on vehicle bodies. More specifically, the present invention pertains to an apparatus in which door assemblies transported to an assembling station are picked up one and located to an appropriate position by means of an assembling robot with respect to a vehicle body on which the door assembly is to be installed so that door installing operation is facilitated.

2. Description of the Prior Art

In Japanese patent publication No. 57-48334, there is disclosed a vehicle door installing apparatus for installing a vehicle side door on a vehicle body which is being transported along an assembling line. The door installing apparatus proposed in this patent publication includes a door locating robot which is adapted to move along the assembling line between a door picking up station and a door installing station. The locating robot picks up a door in the picking up station and moves to the door installing station to locate the door in an appropriate position with respect to the vehicle body in the door installing station. Alternatively, the robot may be moved in a synchronized relationship with the vehicle body which is being transported on the assembling line so that it can locate the door which is carried by the robot with respect to the vehicle body to be installed on the vehicle body. After the door is assembled on the vehicle body, the robot is moved to the door pick up station to repeat the same operation. The U.S. Pat. No. 4,627,158 issued to S. Mitoh proposes to provide the robot with a door locating device for positioning the vehicle door in an accurate position with respect to the robot arm so that the door to be installed on the vehicle body can be located with respect to the vehicle body by simply controlling the robot.

The door installing apparatus as disclosed by the Japanese patent publication is advantageous in that the door to be installed on the vehicle body is automatically carried to the installing station by the robot so that it does not require any man power for transporting the door to the installing station. It should however be noted that the proposed apparatus has a disadvantage in that the robot has to be moved between the installing station and the door picking up position so that no installing operation can be carried out when the robot is being moved. In case of a four door type vehicle which has two side doors on each side, it therefore becomes necessary to have the vehicle body wait in the installing station after one of the side doors is installed until the robot moves to the door pick up position to pick up the second door and comes back to the installing station producing problems of loss of time.

SUMMARY OF THE INVENTION

It is therefore an object of the present invention to provide an apparatus for installing vehicle doors on vehicle bodies which can be operated with a high efficiency.

Another object of the present invention is to provide an assembling apparatus which can eliminate the problems encountered in the known apparatus.

According to the present invention, the above and other objects can be accomplished by locating the door installing robot in the installing station and providing means for picking up an appropriate door at the picking up station and carrying the door to the installing station to be received by the installing robot. According to the present invention, there is therefore provided an apparatus for installing a vehicle door in a vehicle body, the apparatus comprising installing robot means provided at a side of a vehicle body assembling line in a door installing station, control means for making the robot means to operate in a predetermined manner, door storing means provided along said vehicle body assembling line and having a plurality of door storing sections wherein vehicle doors of different types are stored, first door pick up means provided at one side of said robot means in respect of a direction of transportation of the vehicle body in the vehicle body assembling line for picking up a door from a selected one of the door storing sections, second door pick up means provided at the other side of the robot means in respect of the direction of transportation of the vehicle body in the vehicle assembling line for picking up a door from another door storing section, first door transporting means for transferring the door picked up by said first door picking up means to said robot means to be received by the robot means, second door transporting means for receiving the door picked up by said second door picking up means to said robot means to be received by the robot means, door locating means for locating the door transported by said transporting means with respect to said robot means before it is transferring by the robot means, said control means being means for operating said door picking up means, said transporting means and said locating means so that an appropriate door which fits to the vehicle body in the door installing station is picked up by the picking up means and transported to the locating means to be located with respect to said robot means.

According to a preferable aspect of the present invention, a pair of door receiving stations are provided at the opposite sides of the robot means as seen in the direction of the transportation of the vehicle body on which the door is to be installed and the said door locating means is provided in each of the door receiving stations. The present invention is advantageous in that the robot means is not required to be moved back and forth between the door storing means and the assembling station so that the door assembling procedure can be effectively performed.

The above and other objects and features of the present invention will become apparent from the following descriptions of preferred embodiments taking reference to the accompanying drawings.

DESCRIPTION OF THE PREFERRED EMBODIMENT

Figure 1:
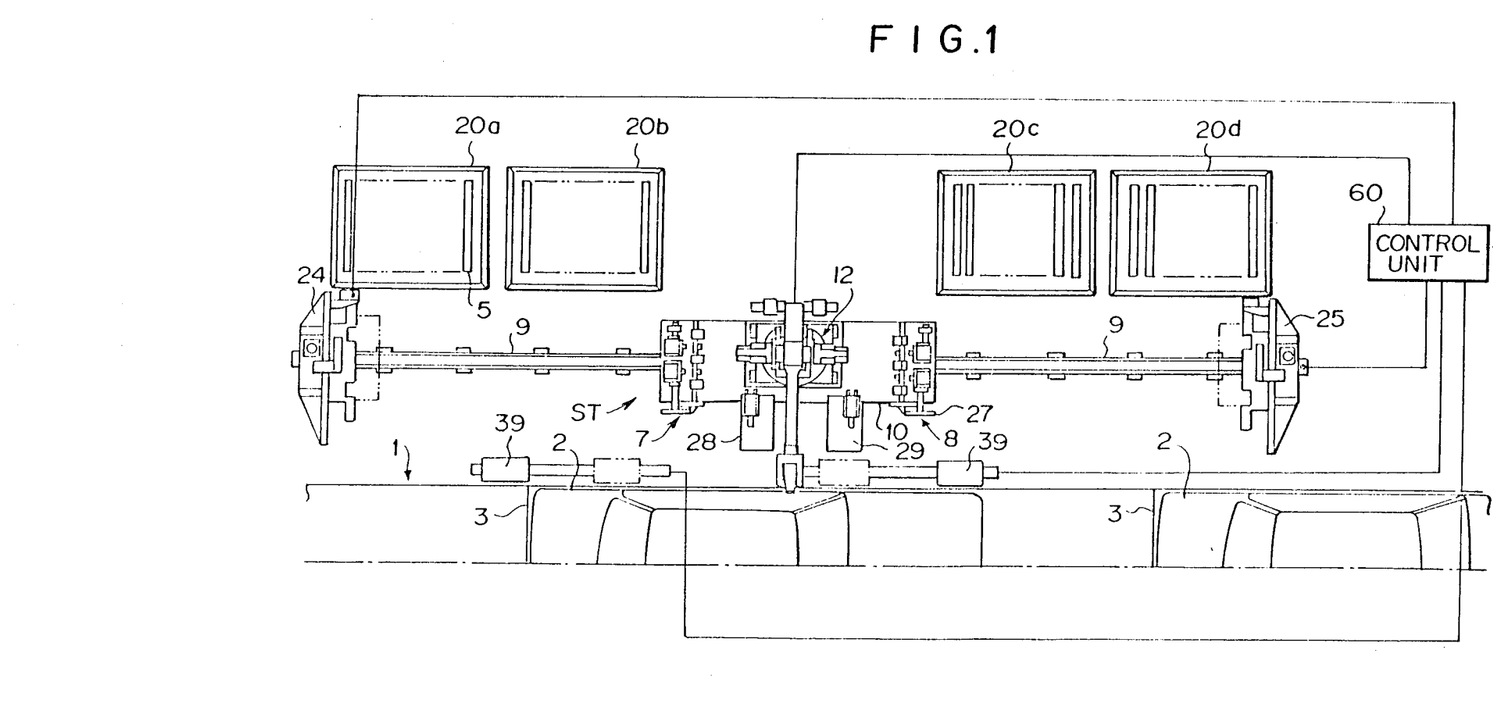
FIG. 1 is a plan view showing a vehicle body assembling line embodying the features of the present invention.

Referring to the drawings, particularly to FIG. 1, there is shown a vehicle body assemblying line 1 in which several different types of vehicle bodies 2 are transported for assembly by appropriate means such as a conveyor 3. The assembling line 1 includes various assembling stations for carrying out various assembling operations. As shown in FIG. 1, the line 1 includes among others a door installing station ST in which side doors 5 are installed on the vehicle body 2.

Figure 2:
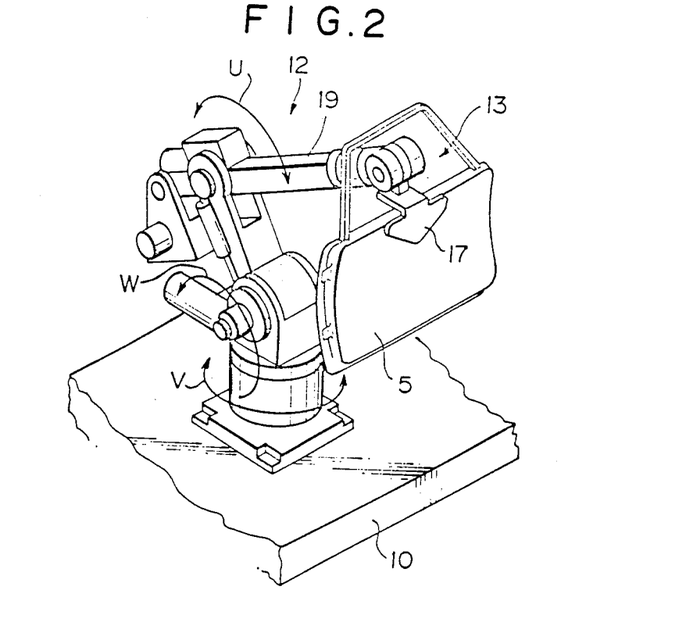
FIG. 2 is a perspective view showing an example of the door installing robot.
Figure 3:
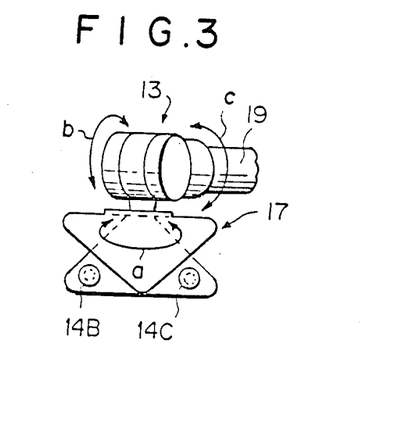
FIG. 3 is a fragmentary perspective view of the robot arm mechanism showing the movements of the robot arm.
Figure 5:
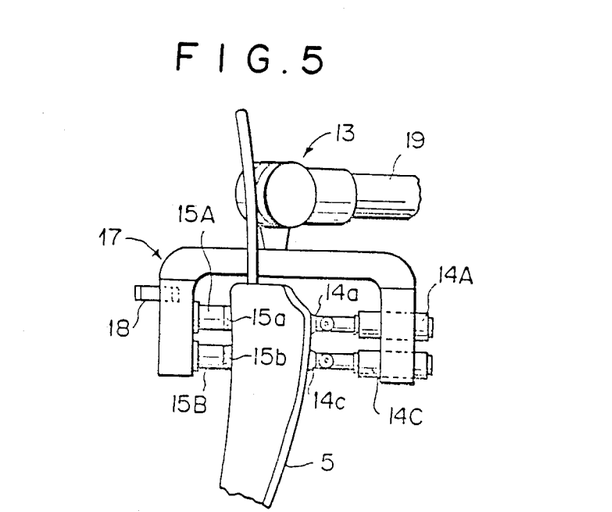
FIG. 5 is a view showing the mechanism for gripping the door to be installed on the vehicle body.
Figure 6:
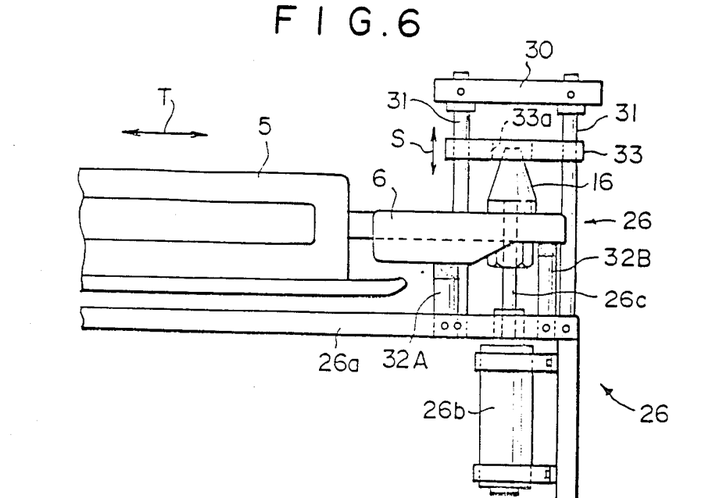
FIG. 6 is a view showing the door locating mechanism.
Figure 7:
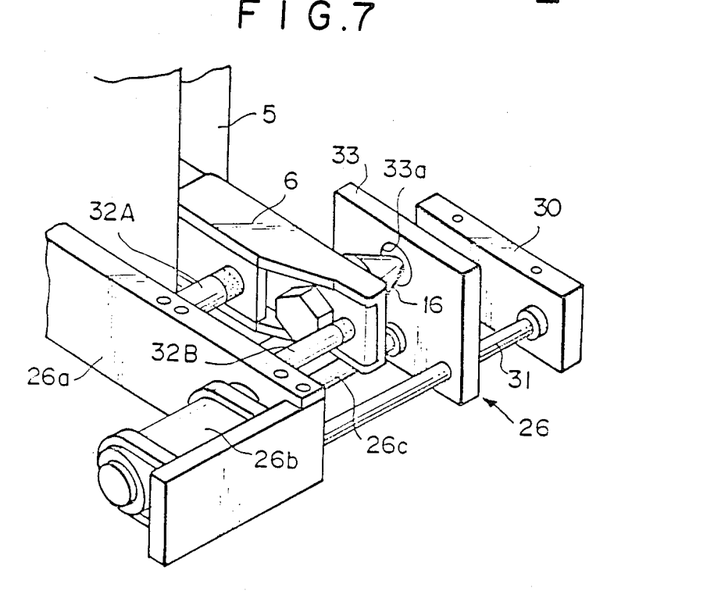
FIG. 7 is a perspective view of the door locating mechanism.

Referring to FIGS. 6 and 7, it will be noted that the door 5 has a hinge bracket 6 which is provided with a tapered pin 16 extending in a direction substantially perpendicular to the bracket for the purpose of locating the door. Referring back to FIG. 1, there is provided a door installing robot 12 at a side of the door installing station ST. The robot 12 is mounted on a base 10 and may be of a multi-articulated teaching-play back type. As shown in FIGS. 3 and 5, the robot 12 has a wrist 13 which is provided with a hand 17 carrying cylinders 14A, 14B and 14C, respectively having vacuum type gripping shoes 14a, 14b and 14c for gripping the door 5. In FIG. 5, it will be noted that the hand 17 is of a U-shaped configuration having two legs and the cylinders 14A, 14B and 14C having the gripping shoes 14a, 14b and 14c, respectively, are mounted on one of the legs. On the other leg of the hand 17, there are mounted resilient pads 15a and 15b. The wrist 13 of the robot 12 is mounted on an arm 19 which is mounted on the base 10 for movements about three perpendicularly intersecting axes as shown by arrows U, V and W in FIG. 2. In the embodiment which is being described, the arm 19 is free to rotate in the direction of the arrow U for 105°, in the direction of the arrow V for 300° and in the direction of the arrow W for 90°. It should further be noted that the hand 17 is rotatable with respect to the wrist 13 for 360° in the direction in the arrow a, for 210° in the direction of the arrow b and for 360° in the direction of the arrow c as shown in FIG. 3. It will therefore be understood that the position of the hand 17 can be determined by the angular positions in the directions shown by the arrows U, V, W, a, b and c. The operations required in the robot hand 17 are in advance taught and memorized by a memory in a control unit 60 which is shown in FIG. 1. The control unit 60 produces control signals OCp for determining the angular positions in the aforementioned six directions.

In FIG. 1, it will further be noted that rails 9 are provided at the opposite sides of the base 10 of the robot 12 as seen in the direction of the transportation of the vehicle body 2. The rails 9 extend along the conveyor 3 and at a side of each rail 9, there are provided a plurality of door storing sections 20a and 20b or 20c and 20d. The door storing section 20a has a pallet carrying a plurality of vehicle doors of the same type. Similarly, the other door storing sections stores respectively different types of doors. The pallets in each door storing station is movable and can be retracted from and inserted into the storing station in the sideward direction. Further, the pallet in the door storing section is so constructed that doors stored therein can be taken out from the side adjacent to the rail 9.

In order to take out the doors from the storing section 20a, 20b, 20c and 20d, there are provided on the rails 9 door pick up carriages 24 and 25, respectively, which function to pick up doors from selected ones of the storing sections and transport the picked up doors to the robot 12. At the opposite sides of the robot 12, there are provided on the base 10 door receiving stations 7 and 8 for receiving the doors from the carriages 24 and 25.

Figure 4:
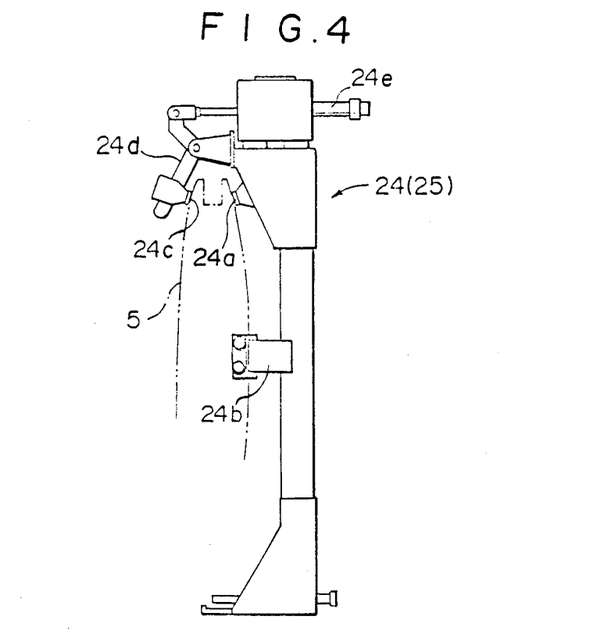
FIG. 4 is a front view showing an example of the door transporting carriage.
Figure 11:
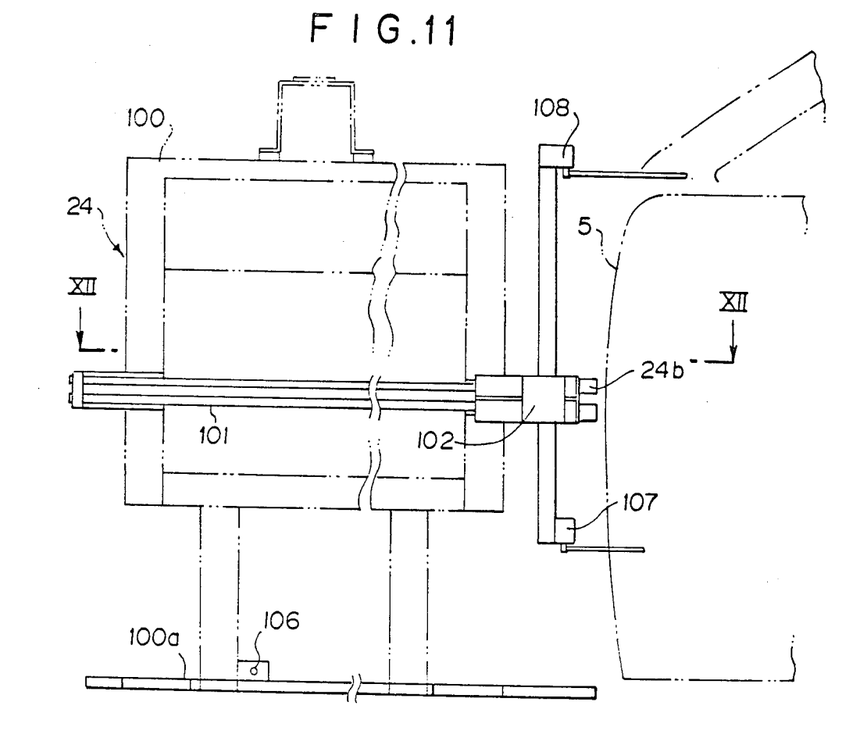
FIG. 11 is a front view of the door pick up mechanism.
Figure 12:
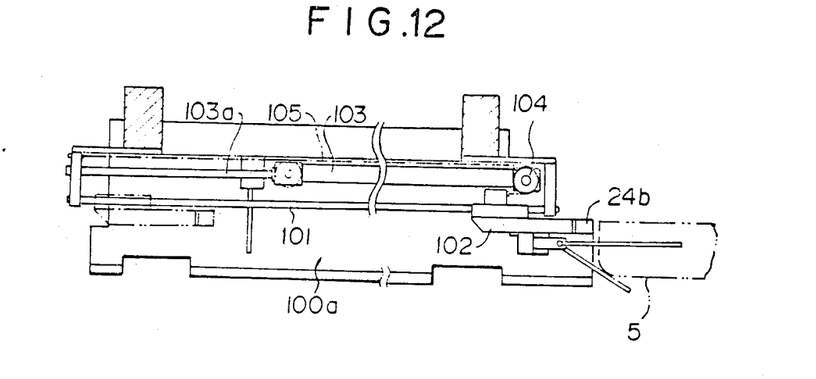
FIG. 12 is a sectional view taken along the line XII—XII in FIG. 11.

The door pick up carriages 24 and 25 may be of any type which can pick up doors from selected ones of the door storing sections. For example, the carriage 24 or 25 may include a stationary magnetic gripping shoe 24a, a lower movable magnetic gripping shoe 24b and an upper movable magnetic gripping shoe 24c which is provided on one end of a link arm 24d which is actuated by a fluid cylinder 24e as shown in FIGS. 4, 11 and 12. As shown in FIGS. 11 and 12, the carriage 24 includes a frame 100 which is perpendicular to the longitudinal direction of the rail 9. On the frame 100, there are a pair of rails 101 extending horizontally in the transverse direction of the frame 100. A slide 102 is mounted on the rails 101 for movement along the rails 101 and the aforementioned lower magnetic shoe 24b is provided on the slide 102.

The frame 100 further carries a fluid cylinder 103 having a cylinder rod 103a as shown in FIG. 12. One end of the cylinder rod 103a is secured to the frame 100 so that the cylinder is movable along the rails 101 as the cylinder 103 expands or contracts. The cylinder 103 carries a sprocket 104 at the opposite ends. The sprocket 104 is connected with a motor (not shown) to be driven thereby. An chain 105 is provided to pass around the sprocket 104 and the slide 102 is attached to the chain 105.

In the position shown in FIG. 12, the slide 102 is in the door pick up position where the magnetic gripping shoe 24b is engaged with a side edge of the door 5. As the chain 105 is driven by the motor, the door 5 is sidewardly retracted toward the carriage 24. At the same time, the cylinder 103 is actuated to retracted the piston rod 103a so that the slide 102 is moved further sidewardly until the door 5 is completely moved on the frame 100 of the carriage 24.

The stationary magnet shoe 24b is mounted on the frame 100 as shown in FIG. 11 which functions to grip the door 5 when it is moved on the frame 100. The cylinder 24e and the link 24d for the gripping shoe 24c are also mounted on the frame 100 and actuated when the door is transferred to the frame 100 to thereby grip the door 5. The frame 100 is provided at the lower portion with a door receiving plate 100a for receiving the door 5 which is transferred to the frame 100 as shown in FIG. 11. On the plate 100a, there is provided a door detecting switch 106 which is actuated when the door 5 is moved to the right position on the frame 100. At the side of the frame 100 adjacent to the door storing section, there is a door detecting switch 107 for detecting the door 5 in the storing section. Above the switch 107, there is further provided a door type detecting switch for detecting whether the door is for a sedan type vehicle or for a hard-top type vehicle. The frame 100 is mounted on the rail 9 for movement along the rail 9. The carriage 25 is of the same structure as that of the carriage 24 so that detailed description will not be made.

In the locating stations 7 and 8, there are provided door locating mechanisms 26 and 27, respectively. As shown in FIGS. 6 and 7, the door locating mechanism 26 includes a base plate 26a which carries a cylinder 26b having a piston rod 26c. A guide bar 31 is provided and supported at one end by the base plate 26a and at the other end by a support plate 30. On the guide bar 31, there is carried a locating plate 33 which is connected to the piston rod 26c to be moved thereby in the direction shown by an arrow S in FIG. 6. The locating plate 33 is formed with a locating hole 33a which is adapted to be engaged with the tapered pin 16 on the hinge bracket 6 to thereby determine the location of the door 5 which is carried on the frame 100 of the carriage 24. The base plate 26a is provided with stationary pads 32A and 32B which are adapted for engagement with the hinge bracket 6. The locating mechanism 27 is constructed as in the case of the locating mechanism 26 so that further descriptions of the mechanism 27 will be omitted.

Figure 8:
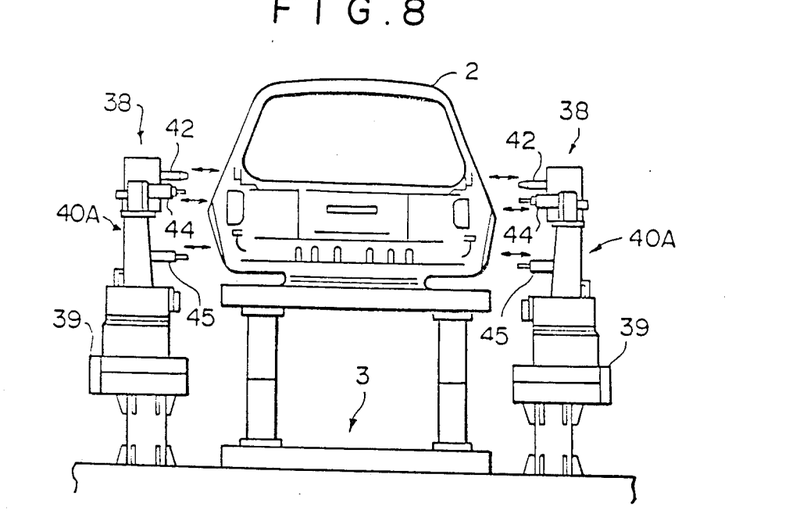
FIG. 8 is a front view showing the vehicle body assembling line.
Figure 9:
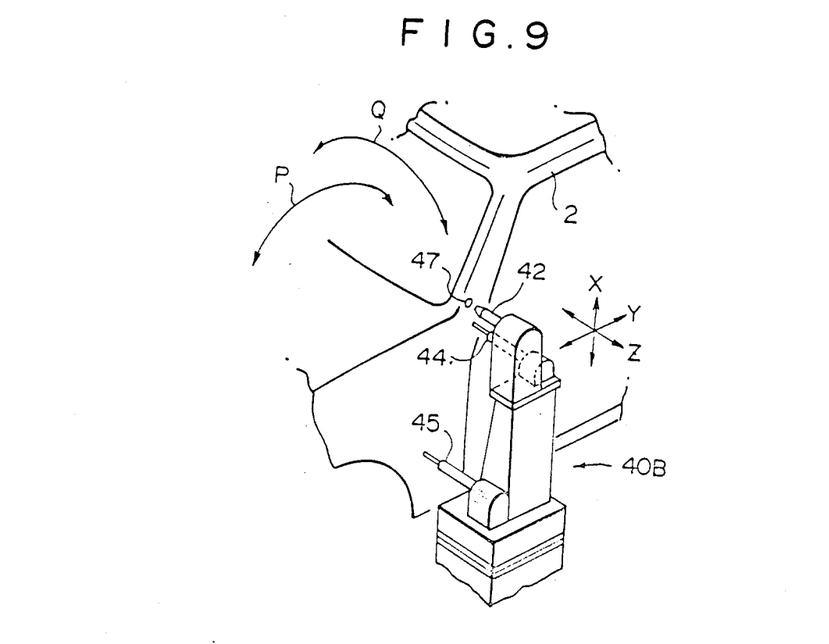
FIG. 9 is a perspective view showing the door position detector.
Figure 10:
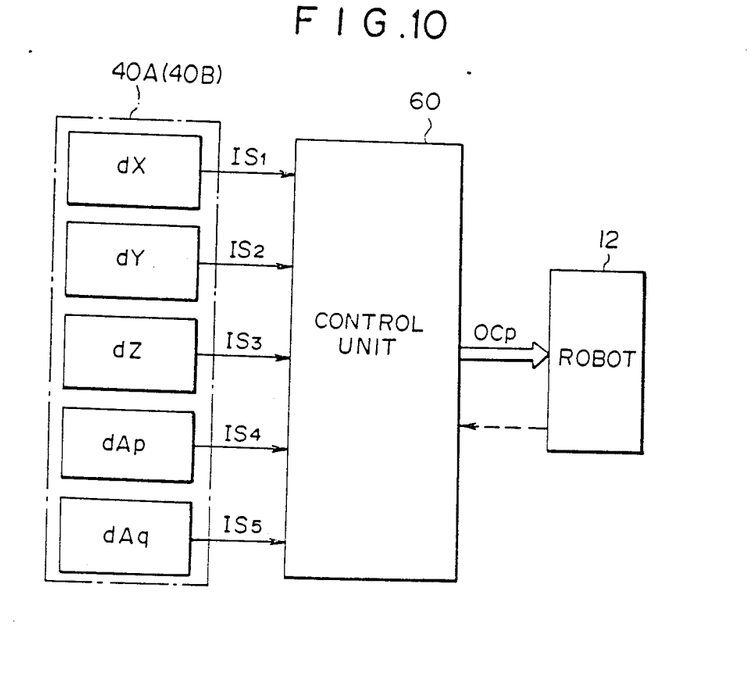
FIG. 10 is a block diagram showing the control system in the door installing apparatus.

In the door installing station ST, there is further provided a vehicle body position detecting mechanism 38 at each side of the assembling line 1 as shown in FIGS. 8 and 9. The mechanism 38 includes a slide table 39 which is movable along the conveyor 3. The slide table 39 carries vehicle body position detectors 40A and 40B which are spaced apart form each other. As shown in FIGS. 8 and 9, each of the detectors 40A and 40B includes a detecting pin 42 having a tapered tip end. The detecting pin 42 is adapted for engagement with a hole 47 provided in the vehicle body 2. The detector further includes position sensors 44 and 45 which are vertically spaced apart from each other and adapted for engagement with predetermined positions on the vehicle body 2. In detecting the position of the vehicle body 2, the pin 42 in engaged with the hole 47 in the body 2 and the position of the body 2 is detected by the sensors 44 and 45. The pin 42 is movable depending on the position of the vehicle body 2 in the direction shown by an arrow in FIG. 8. Further, the pin 42 can be inclined depending on the position of the body 2. Based on the axial position of the pin 42 and the inclination of the pin 42, it is possible to determine offset values dX, dY and dZ in the directions X, Y and Z as shown in FIG. 9. The sensors 44 and 45 can also detect the inclination of the vehicle body 2 in the directions shown by the arrows P and Q in terms of offset angles dAp and dAq.

The offset values are applied to the control unit 60 in the form of signals $IS_1$, $IS_2$, $IS_3$, $IS_4$ and $IS_5$. The control unit 60 performs a calculation based on these signals to obtain informations on the actual position of the vehicle body 2 and the stored data for operating the robot 12 is modified in accordance with the informations on the actual position of the vehicle body 2 so that an appropriate robot control signal $OC_p$ is produced taking into account the actual position of the vehicle body 2.

In operation, vehicle bodies 2 of various types are transported along the assembling line 1 in the order which is determined in advance in accordance with the manufacturing schedule of the day. When a vehicle body is transported to the door installing station ST, the slide table 39 of the vehicle body position detecting mechanism 38 is moved to a predetermined position and the detectors 40A and 40B are operated to produce the aforementioned offset signals $IS_1$ through $IS_5$. Thus, the control unit 60 produces a robot operating signal $OC_p$ which is modified in accordance with the actual position of the vehicle body 2.

After the detection of the position of the vehicle body 2 is thus made, the slide table 39 of the vehicle body position detecting mechanism 38 is retracted and the door installing operation is started. For the purpose, the door pick up carriage 24 or 25 is moved in accordance with a door type signal from the control unit 60 to the pick up position which is adjacent to the storage section storing the doors 5 which are appropriate to the vehicle body 2 located in the door installing station ST. In this instance, signals are produced by the switches 107 and 108 to indicate the position of the storing section and the type of the door stored therein. In case where the type of the door detected is the same as that indicated by the control unit 60 is the same, the carriage 24 or 25 is stopped in the position. Then, the cylinder 103 and the sprocket 104 are driven so that the slide 102 is positioned to have the magnetic shoe 24b engaged with the side edge of the door 5 in the storing section. The magnetic shoe 24b is then energized to magnetically grip the door 5 and the cylinder 103 and the sprocket 104 are then actuated to move the slide 102 away from the storage section until the switch 106 is actuated. The door 5 is thus transferred to the carriage 24 or 25 and the cylinder 24e is actuated to operate the link 24d so that the shoe 24c is moved to the gripping position. The carriage 24 or 25 is then moved along the rail 9 to the door positioning station 7 or 8. In the station 7 or 8, the cylinder 26b is operated to locate the door hinge bracket 6 by means of the locating plate 33.

Thereafter, the robot 12 is actuated so that the arm 19 is rotated by approximately 90° and the cylinders 14A, 14B and 14C of the hand 17 are actuated to have the shoes 14a, 14b and 14c engaged with the appropriate positions of the door 5. The magnetic shoes 24a, 24b and 24c on the carriage 24 or 25 are then deenergized to release the door 5 and the cylinder 24e is actuated to move the shoe 24c away from the door 5. The arm 19 is then actuated to turn in the opposite direction for about 90° to place the door 5 in the installing position as shown in FIG. 2. The robot 12 is further operated to move the door 5 from the position shown in FIG. 2 to the position on the vehicle body. The wrist 13 and the hand 17 are appropriately operated to place the door 5 with respect to the vehicle body 2. Since the operation of the robot 12 is modified in accordance with the actual location of the body 2, the door can be located accurately with respect to the body 2. After the door is positioned with respect to the body 2, appropriate installing instruments such as multiple nut runners 28 and 29 are operated to install the door 5. As the door 5 is being installed, the carriage 24 or 25 is moved to the pick up position to pick up another door 5. Thus, the door install operation can be performed without any loss in the working time of the robot 12.

In the embodiment which is being described, the vehicle body 5 may be of a four door type having a pair of front side doors and a pair of rear side doors. The door storing sections 20a and 20b may then contain rear side doors for a sedan type vehicle and for a hard-top type vehicle, respectively, whereas the door storing sections 20c and 20d may contain front side doors for a sedan type vehicle and for a hard-top type vehicle, respectively. With this arrangement, it becomes possible to operate the carriage 24 for picking up and transporting the rear side doors and to operate the carriage 25 for picking up and transporting the front side doors. Then, the carriages 24 and 25 can be operated alternately so that operating efficiency is improved. In case where the line 1 is used for assembling four door type vehicles with or without a back door and two door type vehicle with or without a back door, the doors for the two door type vehicles may be stored in the sections 20a and 20c, the front doors for the four door type in the section 20b, and the rear doors for the four door type vehicles in the sections 20d. If necessary, additional door storing sections may be provided in the opposite sides of the robot as seen in the direction of transportation of the vehicle body. Arrangement may be such that in each side of the robot 12, there may be provided a required number of door storing sections for storing required types of doors.

Figure 13:
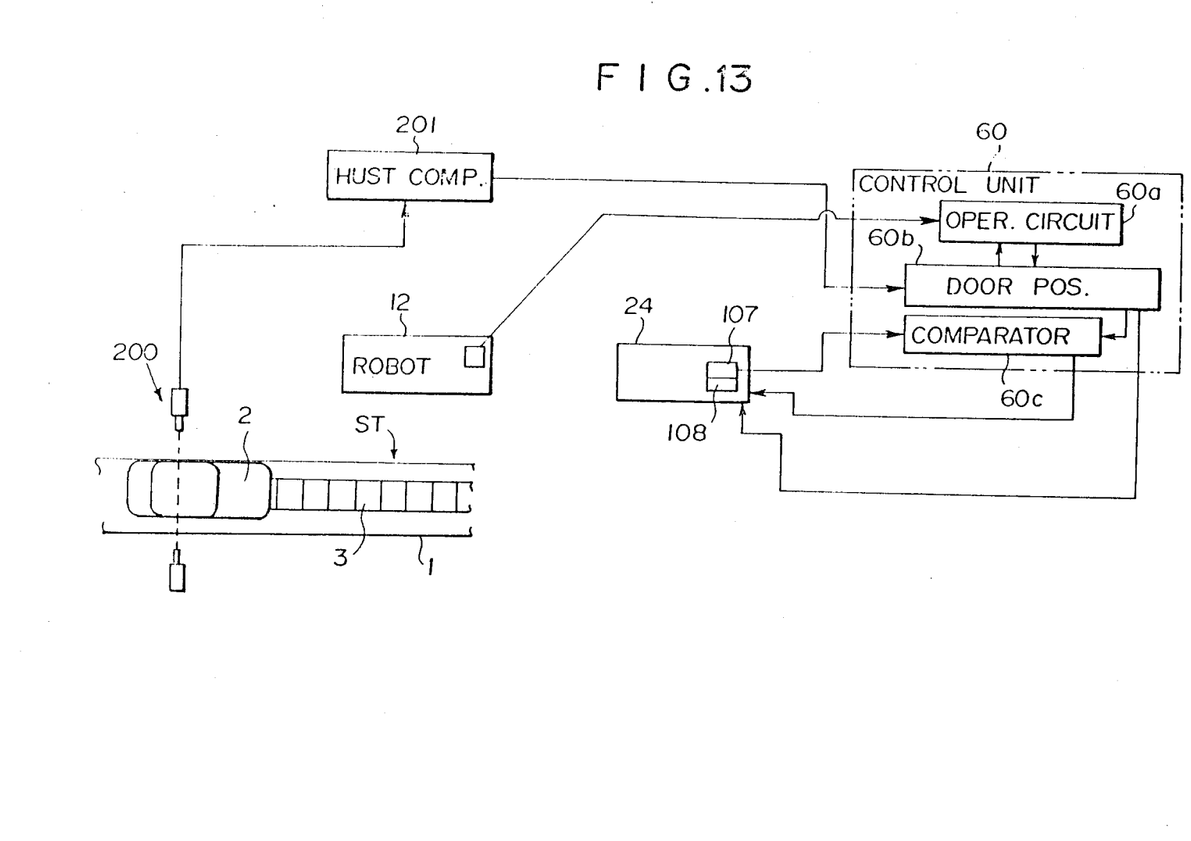
FIG. 13 is a block diagram showing the control circuit which can be used in the embodiment of FIGS. 1 through 12.

Referring to FIG. 13, the embodiment shown therein includes a body transfer detecting photoelectric sensor arrangement 200 which produces a detection signal when the vehicle body 2 is transferred into the door install station ST. The detection signal is applied to a host computer 201 which has memories of the production schedule of the day. The host computor 201 produces a type signal designating the type of the vehicle which is being brought into the door install station. The type signal is applied by the host computor 201 to the control unit 60 which includes an operation circuit 60a, a door storing section memory 60b for memorizing the positions and the types of the stored doors in the respective door storing sections, and a door type comparison circuit 60c. The type signal from the host computor 201 is applied to the memory 60b in the control unit 60 and the control unit 60 produces a signal designating the specific door storing section storing the door which is to be picked up as well as the location of the door in the storing section in accordance with the type signal and the signal from the operation circuit 60a. The door type comparison circuit 60c interprets the type of the door detected by the switches 107 and 108 and produces a door pick up signal when the detected door is in conformance with the type of the door which is to be installed. Then, the door pick up carriage 24 is operated as already described. As soon as the carriage reaches the door install station, the robot 12 is operated to receive the door from the carriage 24 as already described. After the install operation is completed, a completion signal is produced by the robot 12 and the completion signal is applied to the operation circuit 60a.

The invention has thus been shown and described with reference to specific embodiments, however, it should be noted that the invention is in no way limited to the details of the illustrated structures but changes and modifications may be made without departing from the scope of the appended claims.

I claim:

1. An apparatus for installing a vehicle door on a vehicle body, the apparatus comprising installing robot means provided at a side of a vehicle body assembling line in a door installing station for installing doors on vehicle bodies on the assembling line, the robot means being stationary with respect to the assembling line, control means for making the robot means to operate in a predetermined manner, door storing means provided along said vehicle body assembling line and having a plurality of door storing sections wherein vehicle doors of different types are stored, door pick up means for picking up a door from a selected one of the door storing sections, door transporting means for transporting the door picked up-by said door picking up means to said robot means to be received by the robot means, door locating means for locating the door transported by said transporting means with respect to said robot means before it is received by the robot means, said control means being means for operating said door picking up means, said transporting means and said locating means so that an appropriate door which fits to the vehicle body in the door installing station is picked up by the picking up means and transported to the locating means to be located with respect to said robot means.

2. Apparatus in accordance with claim 1, in which the transporting means includes carriage means on which the door pick up means is provided, the carriage means being provided with door location detecting means for detecting that the door is located at a predetermined position on the carriage means.

3. Apparatus in accordance with claim 1, in which the transporting means includes carriage means, rail means extending along the vehicle body assembling line from the door installing station, the carriage means being movable on the rail means.

4. An apparatus for installing a vehicle door on a vehicle body, the apparatus comprising installing robot means provided at a side of a vehicle body assembling line in a door installing station, control means for making the robot means to operate in a predetermined manner, door storing means provided along said vehicle body assembling line and having a plurality of door storing sections wherein vehicle doors of different types are stored, first door pick up means provided at one side of said robot means in respect of a direction of transportation of the vehicle body in the vehicle body assembling line for picking up a door from a selected one of the door storing sections, second door pick up means provided at the other side of the robot means in respect of the direction of transportation of the vehicle body in the vehicle assembling line for picking up a door from another door storing section, first door transporting means for transporting the door picked up by said first door picking up means to said robot means to be received by the robot means, second door transporting means for transporting the door picked up by said second door picking up means to said robot means to be received by the robot means, door locating means for locating the door transported by said transporting means with respect to said robot means before it is received by the robot means, said control means being means for operating said door picking up means, said transporting means and said locating means so that an appropriate door which fits to the vehicle body in the door installing station is picked up by the picking up means and transported to the locating means to be located with respect to said robot means.

5. An door installing apparatus in accordance with claim 4 which includes a first door receiving station provided at a side of the robot means adjacent to the first transporting means for receiving the door transported by said first transporting means, a second door receiving station provided at a side of the robot means adjacent to the second transporting means for receiving the door transported by said second transporting means, said door locating means being provided in each of the first and second door receiving stations.

6. A door installing apparatus in accordance with claim 4 in which each of said first and second door pick up means includes door holding means movable toward and away from the door storing sections.

7. A door installing apparatus in accordance with claim 6 in which said door holding means includes electromagnetic means which magnetically holds the door when energized.

8. A door installing apparatus in accordance with claim 4 in which each of said first and second door pick up means includes detecting means for detecting the doors stored in the door storing sections.

9. A door installing apparatus in accordance with claim 8 in which each of said first and second door pick up means includes door type discriminating means for discriminating types of doors in said door storing sections.

10. A door installing apparatus in accordance with claim 8 in which said door detecting means includes switch means for sensing the door in the door storing section.

11. A door installing apparatus in accordance with claim 4 in which said transporting means includes carriage means on which said door pick up means is provided, said carriage means being provided with door location detecting means for detecting that the door is located at a predetermined position on the carriage means.

12. A door installing apparatus in accordance with claim 4 in which said transporting means includes carriage means, rail means extending along said vehicle body assembling line from said door installing station, said carriage means being movable on said rail means.

13. A door installing apparatus in accordance with claim 4 in which said door storing section located at one side of the robot means in respect of the direction of transportation of the vehicle body stores doors which are of a type that are to be installed in an immediately succeeding sequence of installation of the door of the type stored in the door storing section located at the other side of the robot means in respect of the direction of transportation of the vehicle body.

14. A door installing apparatus in accordance with claim 4 in which said control means includes memories of information on types of the doors stored in respective ones of the door storing sections.

15. A door installing apparatus in accordance with claim 4 in which said robot means includes means for applying a door installation completion signal to said control means.

16. A door installing apparatus in accordance with claim 15 in which said control means includes operation means for determining the door storing section storing the door which is to be picked up in an immediately succeeding sequence and the location in the door storing section of the door which is to be picked up.

17. A door installing apparatus in accordance with claim 9 in which said control means includes comparator means for comparing the door type discriminated by said door type discriminating means with a type of the door memorized in said control means as the type of the door which is to be picked up in an immediately succeeding sequence.

* * * * *